(12) United States Patent
Tange

(10) Patent No.: US 6,729,634 B2
(45) Date of Patent: *May 4, 2004

(54) HEADSET FOR BICYCLE

(76) Inventor: Satoshi Tange, 2-2-3 Nansyo Cho Sakai, Osaka (JP)

( * ) Notice: Subject to any disclaimer, the term of this patent is extended or adjusted under 35 U.S.C. 154(b) by 4 days.

This patent is subject to a terminal disclaimer.

(21) Appl. No.: 10/179,230

(22) Filed: Jun. 26, 2002

(65) Prior Publication Data

US 2003/0189307 A1 Oct. 9, 2003

(51) Int. Cl.$^7$ .............................................. B62K 21/00
(52) U.S. Cl. ........................ 280/279; 280/539; 280/545; 280/617
(58) Field of Search ................................ 280/276, 279; 384/538, 539, 545, 570, 617

(56) References Cited

U.S. PATENT DOCUMENTS

| | | | | |
|---|---|---|---|---|
| 3,918,779 A | * | 11/1975 | Halliger et al. | 384/538 |
| 3,953,142 A | * | 4/1976 | Price et al. | 403/371 |
| 4,593,924 A | * | 6/1986 | Cabeza | 280/279 |
| 5,286,118 A | * | 2/1994 | Chi | 384/545 |
| 5,573,262 A | * | 11/1996 | Chi | 280/279 |
| 6,332,735 B1 | * | 12/2001 | Wang | 403/371 |
| 6,431,575 B2 | * | 8/2002 | Campagnolo | 280/279 |
| 6,497,425 B1 | * | 12/2002 | Tange | 280/279 |

* cited by examiner

*Primary Examiner*—Daniel G. DePumpo
(74) *Attorney, Agent, or Firm*—Browdy and Neimark, P.L.L.C.

(57) ABSTRACT

A headset for use in the frame body of a bicycle or tricycle is constructed to include a ball bearing, an annular cap covered on the ball bearing, and an annular tightening member mounted in between the cap and the ball bearing. The tightening member has a top coupling flange forced into engagement with an inside mounting groove of the cap and a bottom hooked retaining portion hooked on a bottom edge of the ball bearing, keeping the ball bearing and the cap and the tightening member secured together for easy installation.

23 Claims, 8 Drawing Sheets

HEADSET FOR BICYCLE

BACKGROUND OF THE INVENTION

1. Field of the Invention

The present invention relates to the frame structure of a bicycle/tricycle and, more specifically, to a headset for bicycle/tricycle, which can easily accurately be installed in the frame structure of the bicycle/tricycle and, which keep the parts secured together for easy installation.

2. Description of the Related Art

FIG. 1 illustrates a prior art headset 1 installed in the frame structure of a bicycle or tricycle. The frame structure of the bicycle or tricycle comprises a head tube 2, a front fork top tube 3 inserted through the head tube 2 from the bottom side, and a handlebar stem 4 fastened to the top end of the front fork top tube 3 to hold handlebars. When the rider turning the handlebars of the bicycle or tricycle, the handlebar stem 4 and the front fork top tube 3 are turned with the handlebars. The headset 1 comprises a top ball cup set 6 and a bottom ball cup set 7. The top ball cup set 6 comprises a cup 8 provided at the top side of the head tube 2, a ball bearing 9 received in the cup 8, a cap 10 covered on the top side of the cup 8, and a split packing member 11 mounted on the inner side of the ball bearing 9. When the handlebar stem 4 pressed downwards against the cap 10 and the split packing member 11, the split packing member 11 is radially inwardly compressed and clamped on the periphery of the front fork top tube 3. At the same time, the tapered face 12 of the split packing member 11 is forced against the ball bearing 9, for enabling the inner race 13 of the ball bearing 9 to be rotated with the front fork top tube 3 relative to the head tube 2. The structure of the bottom ball cup set 7 is similar to the top ball cup set 6.

The aforesaid headset 1 is not easy to install. For example, when installing the top ball cup set 6, it is necessary to put the cup 8 in the top side of the head tube 2 at first, and then to put the ball bearing 9 and the split packing member 11 in the cup 8 in proper order, and then to cover the cap 10 on the ball bearing 9 and the split packing member 11. This installation procedure is time and labor consuming, and must be performed in proper order. Further, regular assembly factories commonly provide different sizes of headset component parts in the inventory for use in different sizes or types of vehicles. Before assembly, the worker must pick up headset component parts of corresponding size or type for matching. Much time is wasted in picking up component parts before each assembly procedure.

SUMMARY OF THE INVENTION

The present invention has been accomplished to provide a headset for bicycle/tricycle, which eliminates the aforesaid drawbacks. It is the main object of the present invention to provide a headset for vehicle, which is easy to install.

It is another object of the present invention to provide a headset for vehicle, which keeps component parts arranged in set for easy installation and storage.

To achieve these objects of the present invention, the headset is installed in a frame structure of a vehicle, for example, a bicycle or tricycle. The frame structure of the vehicle comprises a head tube, a front fork having a top tube inserted through the head tube, and a handlebar stem fastened to a top end of the top tube of the front fork to hold handlebars, the head tube having a top annular inside mounting groove in a top end thereof. The headset comprises an annular top bearing mounted in the top annular inside mounting groove of the head tube and peripherally disposed in contact with an inside wall of the head tube, the top bearing having a tapered face disposed on the inside at a top side thereof; a top tightening member shaped like a split ring sleeved onto the top tube of the front fork, the top packing member having a split, a vertical wall portion disposed in contact with the periphery of the top tube of the front fork, a top coupling flange upwardly extended from a top side of the vertical wall portion, a horizontal stop flange extended around a middle part of the periphery of the vertical wall portion, and a hooked retaining portion protruded from a bottom side of the vertical wall portion and hooked on a bottom edge of the top bearing, the horizontal stop flange having a tapered face disposed at a bottom side thereof and fitting over the tapered face of the top bearing; and an annular top cap sleeved onto the top tube of the front fork and covered on the top bearing and the top packing member at a top side and stopped at a bottom side of the handlebar stem, the top cap having an inside annular mounting groove forced into engagement with the top coupling flange of the top packing member.

DETAILED DESCRIPTION OF THE PREFERRED EMBODIMENT

Figure 1:
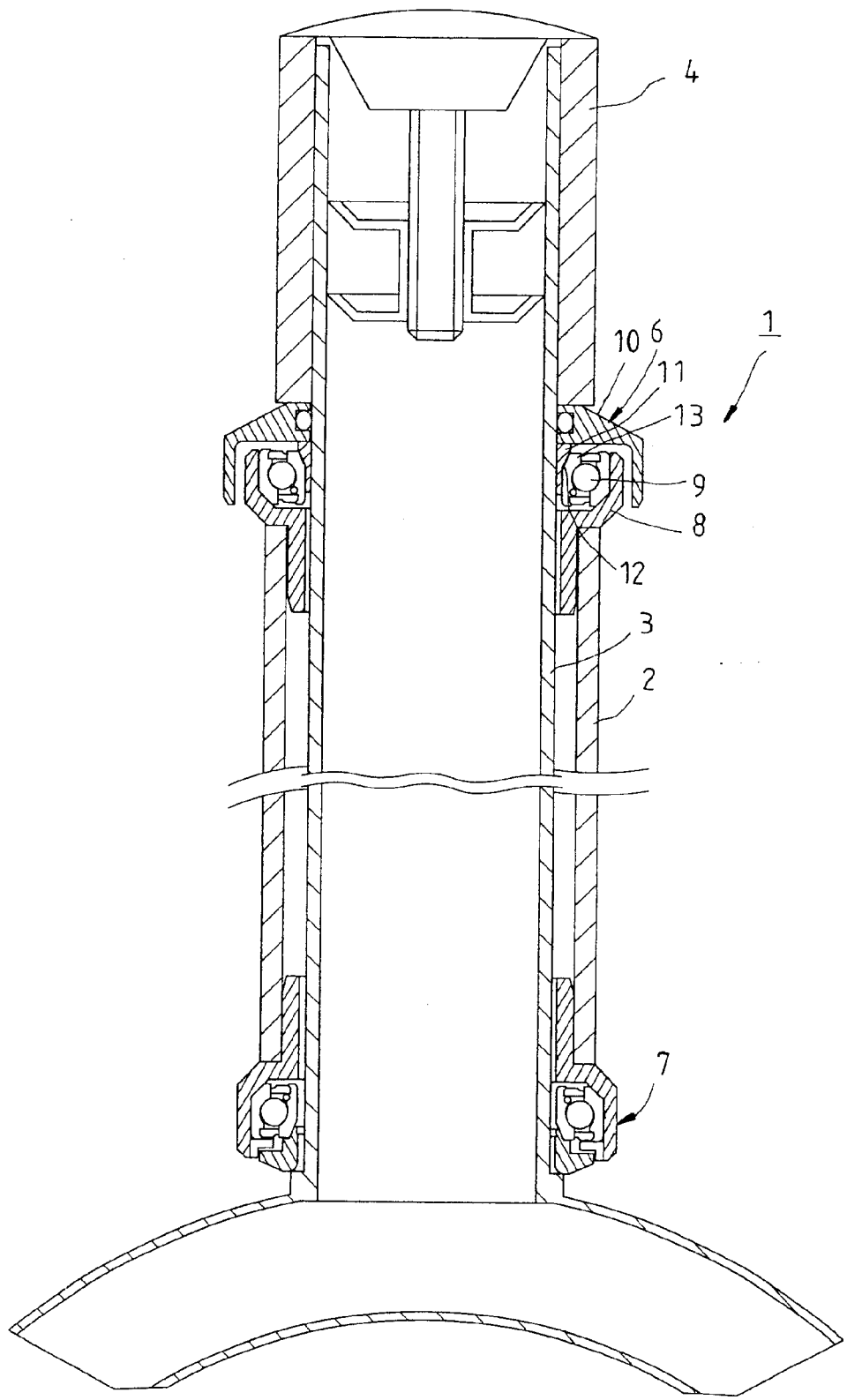
FIG. 1 is a sectional view showing a prior art headset installed in the frame structure of a bicycle.
Figure 2:
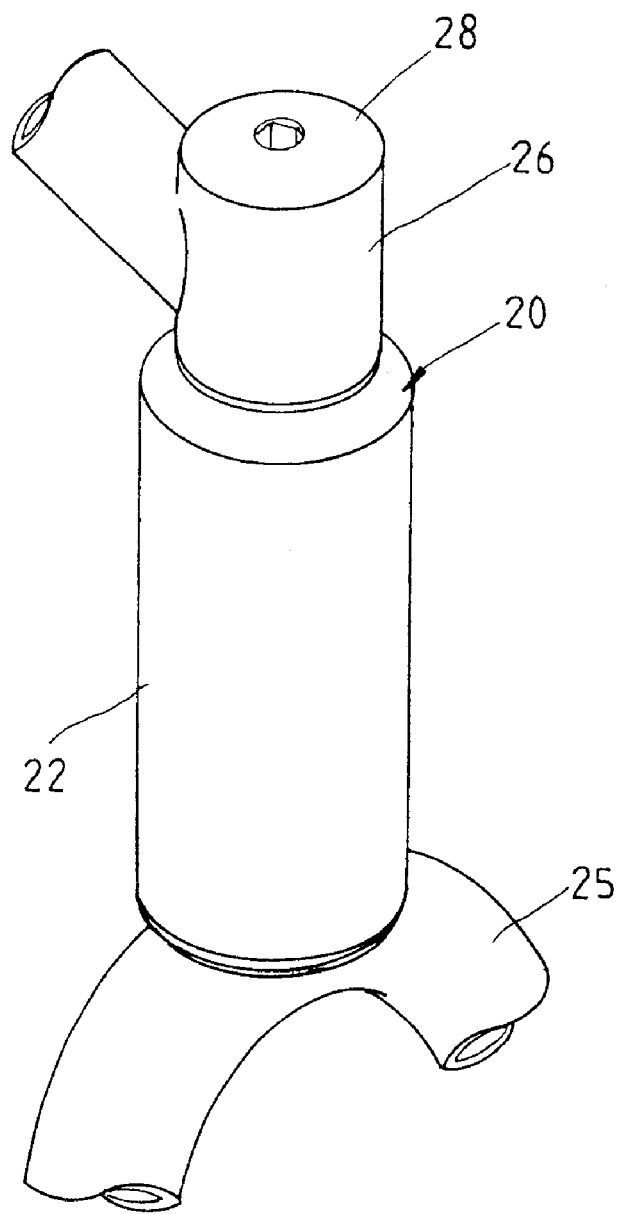
FIG. 2 is a perspective view showing a headset installed in a bicycle's head tube according to a first preferred embodiment of the present invention.
Figure 3:
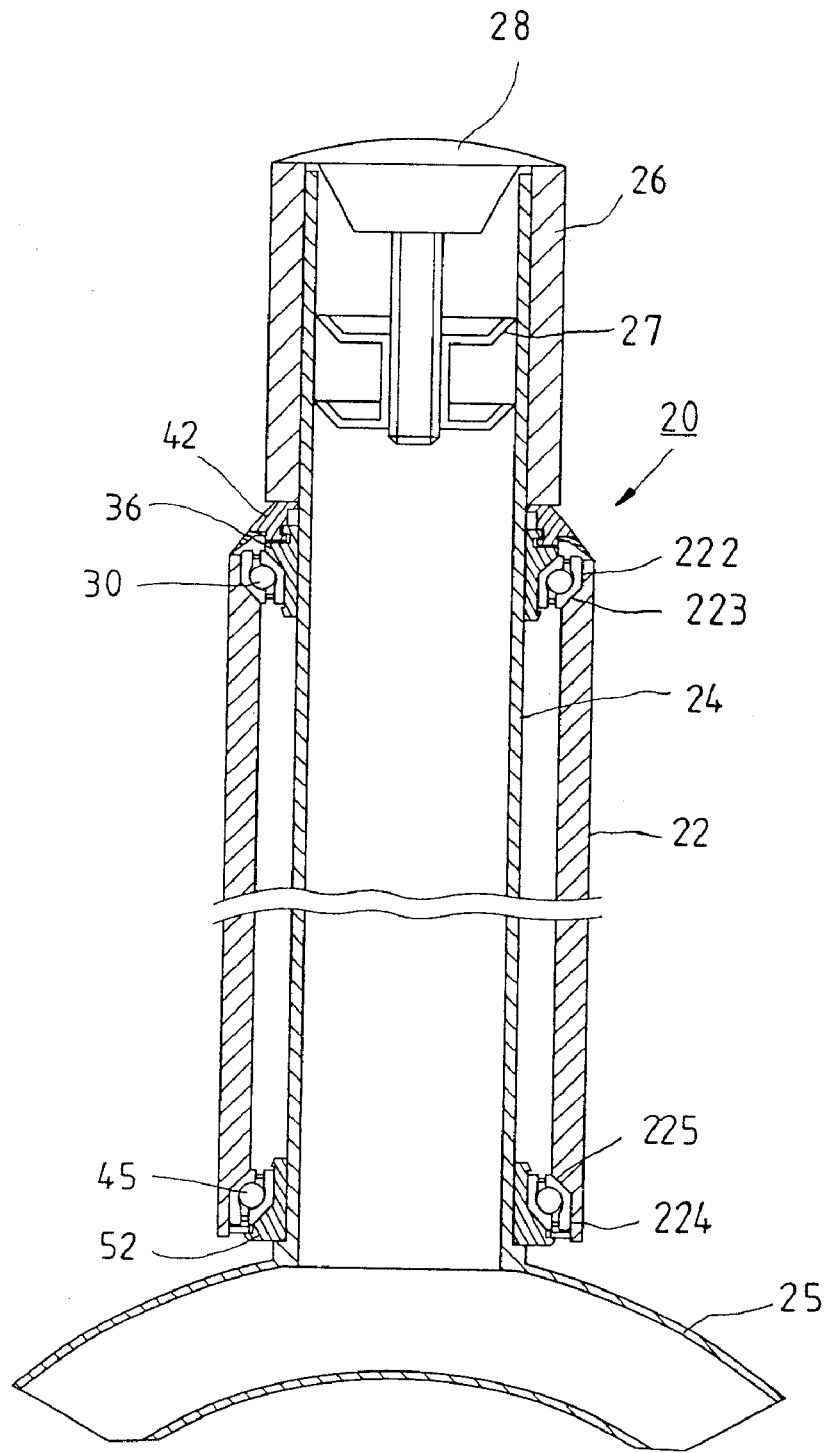
FIG. 3 is a sectional view of the first preferred embodiment of the present invention showing the headset installed in the head tube.
Figure 4:
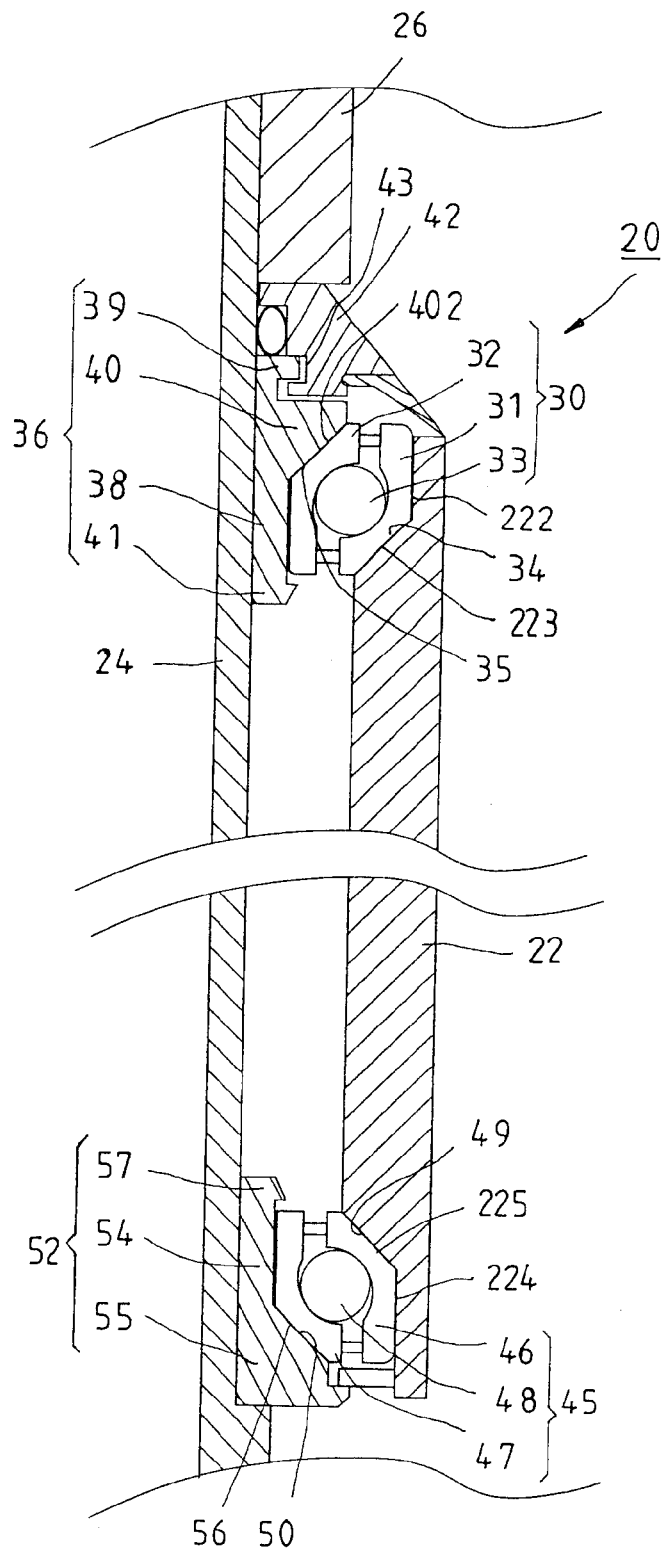
FIG. 4 is a sectional view in an enlarged scale of a part of FIG. 3.
Figure 5:
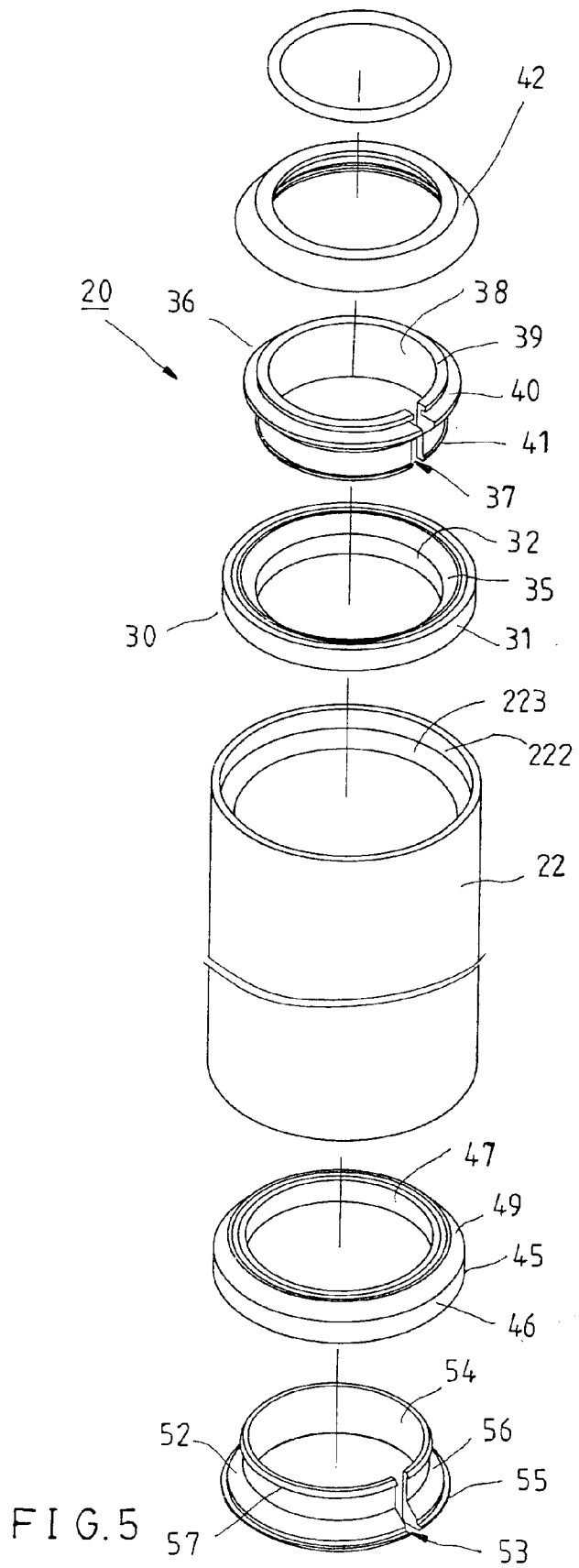
FIG. 5 is an exploded view of the headset according to the first preferred embodiment of the present invention.

Referring to FIGS. from 2 through 5, a headset 20 in accordance with a first preferred embodiment of the present invention is shown installed in the frame structure of a bicycle or tricycle. The frame structure of the bicycle or tricycle comprises a head tube 22, a front fork 25 holding a front wheel (not shown), the front fork 25 having a top tube 24 inserted through the head tube 22 from the bottom side, and a handlebar stem 26 fastened to the top end of the top tube 24 of the front fork 25 by a wrought iron 27 and a screw bolt 28 to hold handlebars (not shown). When the rider turning the handlebars of the bicycle or tricycle, the handlebar stem 26 and the front fork 25 are turned with the handlebars. The head tube 22 comprises a top annular inside mounting groove 222 in the top end, a bottom annular inside mounting groove 224 in the bottom end, a first tapered face 223 extended around the inside wall at the bottom side of the top annular inside mounting groove 222, and a second tapered face 225 extended around the inside wall at the top side of the bottom annular inside mounting groove 224. The headset 20 comprises a top bearing 30, a top packing member 36, a top cap 42, a bottom bearing 45, and a bottom packing member 52.

The top bearing 30 is an annular member mounted in the top annular inside mounting groove 222 of the head tube 22, comprising an outer race 31, an inner race 32 coupled in parallel to the outer race 31, and a plurality of rolling balls 33 mounted in between the outer race 31 and the inner race 32 for enabling the outer race 31 and the inner race 32 to be rotated relative to each other. The outer race 31 is peripherally stopped against the inside wall of the head tube 22, having a tapered face 34 disposed at the bottom side and fitting over the first tapered face 223 of the head tube 22. The inner race 32 has a tapered face 35 disposed at the top side.

The top tightening member 36 is shaped like a split ring sleeved onto the top tube 24 of the front fork 25 and fitted into the inside of the inner race 32 of the top bearing 30, having a split 37, a vertical wall portion 38, a top coupling flange 39 upwardly extended from the top side of the vertical wall portion 38, a horizontal stop flange 40 extended around a middle part of the periphery of the vertical wall portion 38, and a hooked retaining portion 41 protruded from the bottom side of the vertical wall portion 38. The horizontal stop flange 40 has a tapered face 402 disposed at the bottom side and fitting over the tapered face 35 of the inner race 32 of the top bearing 30. The hooked retaining portion 41 of the top tightening member 36 is hooked on the bottom edge of the inner race 32 of the top bearing 30, keeping the top tightening member 36 coupled to the top bearing 30. The inner surface of the vertical wall portion 38 is disposed in contact with the periphery of the top tube 24 of the front fork 25.

The top cap 42 is a tapered annular cup sleeved onto the top tube 24 of the front fork 25 and covered on the top bearing 30 and the top tightening member 36 at the top side and stopped at the bottom side of the handlebar stem 26 to protect the headset 20 against outside dust and rainwater, having an inside annular mounting groove 43 forced into engagement with the top coupling flange 39 of the top tightening member 36.

When the top cap 42 receives a downward pressure from the handlebar stem 26, the top tightening member 36 is radially compressed inwards and simultaneously forced downwards along the tapered face 35 of the inner race 32 of the top bearing 30 to clamp the periphery of the top tube 24 of the front fork 25 and to push the top bearing 30, thereby causing the top bearing 30 to be positively positioned in the top annular inside mounting groove 222 of the head tube 22 and, allowing the top tube 24 to be rotated with the front fork 25 in the head tube 22 relative to the head tube 22. Further, because the top bearing 30, the top tightening member 36 and the top cap 42 are coupled together, they can conveniently be installed in the top annular inside mounting groove 222 of the head tube 22 in the accurate position. When removing the headset 20 from the head tube 22, the top bearing 30, the top tightening member 36 and the top cap 42 are maintained coupled together. Therefore, the top bearing 30, the top tightening member 36 and the top cap 42 do not fall from one another during a maintenance work.

Further, the bottom bearing 45 is mounted in the bottom annular inside mounting groove 224 of the head tube 22. The bottom bearing 45 comprises an outer race 46, an inner race 47 coupled to the inside of the outer race 46, and a plurality of rolling balls 48 mounted in between the outer race 46 and the inner race 47 for enabling the outer race 46 and the inner race 47 to be rotated relative to each other. The outer race 46 is peripherally disposed in contact with the inside wall of the head tube 22, having a tapered face 49 disposed at the top side and fitting over the second tapered face 225 of the bottom annular inside mounting groove 224 of the head tube 22. The inner race 47 has a tapered face 50 disposed at the bottom side.

The bottom tightening member 52 is shaped like a split ring provided between the top tube 24 of the front fork 25 and the bottom bearing 45 and supported on the top of the front fork 25, having a split 53, a vertical wall portion 54, a horizontal stop flange 55 extended around the periphery of the vertical wall portion 54 at the bottom side, and a hooked retaining portion 57 protruded from the top side of the vertical wall portion 54. The horizontal stop flange 55 has a tapered face 56 fitting over the tapered face 50 of the inner race 47 of the bottom bearing 45. The hooked retaining portion 57 of the bottom packing member 52 is hooked on the top edge of the inner race 47 of the bottom bearing 45, keeping the bottom tightening member 52 coupled to the bottom bearing 45.

Because the bottom bearing 45 and the bottom tightening member 52 are coupled together, they can conveniently be installed in the bottom annular inside mounting groove 224 of the head tube 22 in the accurate position. When removing the headset 20 from the head tube 22, the bottom bearing 45 and the bottom tightening member 52 are maintained coupled together. Therefore, the bottom bearing 45 and the bottom tightening member 52 do not fall from each other during a maintenance work.

It is to be understood that the main feature of the present invention is the coupling arrangement of the top bearing 30 and the top packing member 36 with the top cap 42 and the coupling arrangement of the bottom bearing 45 with the bottom packing member 52. The bearings 30, 45 of the headset 20 and the inside mounting grooves 222, 224 of the head tube 22 may be variously embodied. Alternatively, bearing cup means or the like may be used in the head tube 22 instead of the inside mounting grooves 222, 224 to support the bearings 30, 45.

Figure 6:
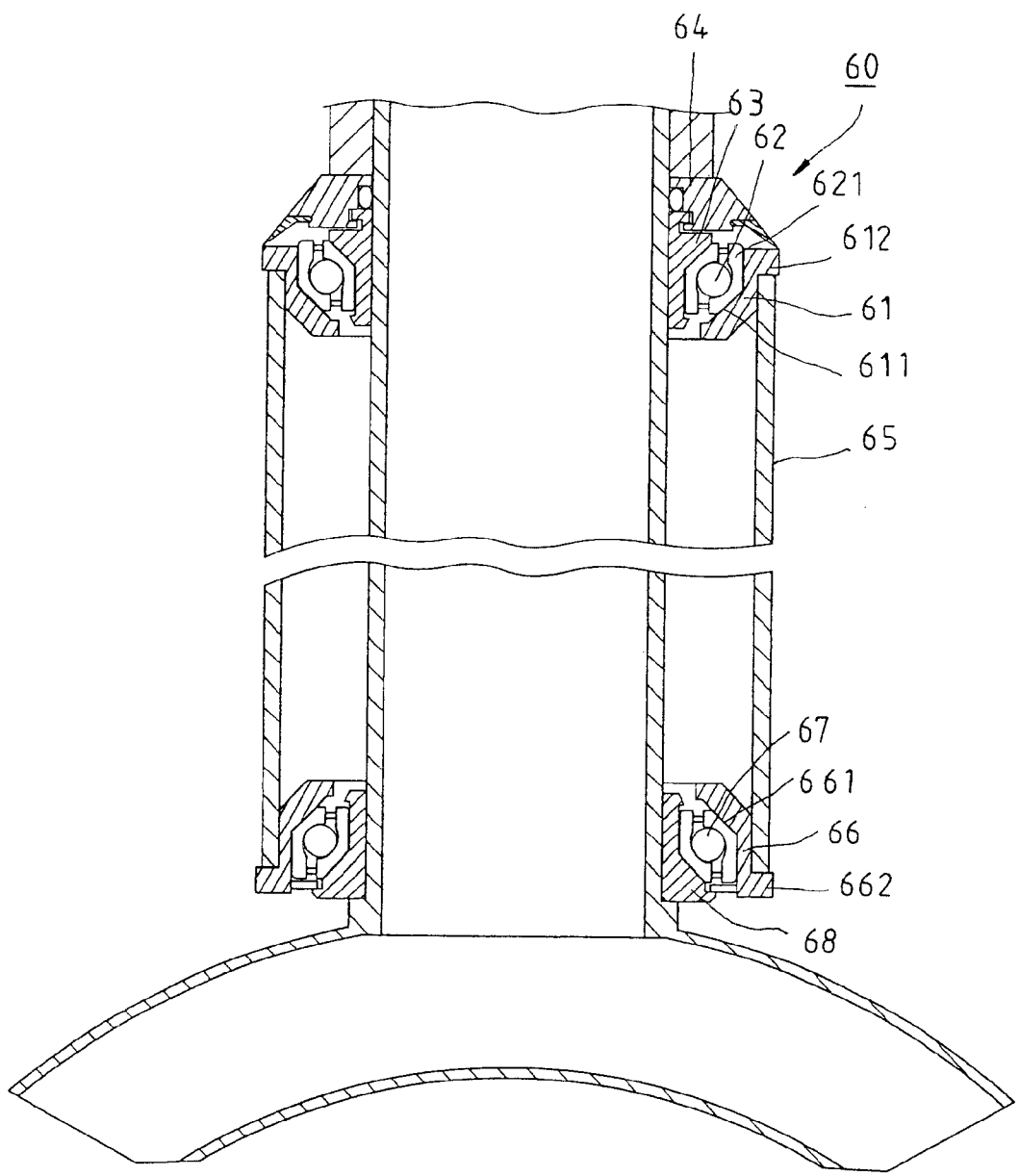
FIG. 6 is a sectional view showing a headset installed in a bicycle's head tube according to a second preferred embodiment of the present invention.

FIG. 6 shows a headset 60 according to a second preferred embodiment of the present invention. According to this embodiment, the headset 60 comprises a top cup 61, a top bearing 62, a top tightening member 63, and a top cap 64. The top cup 61 is an annular member defining an inside receiving open chamber 611 adapted for receiving the top bearing 62, keeping the periphery of the outer race 621 of the top bearing 62 disposed in contact with the inside wall of the top cup 61. The top cup 61 has an outward top flange 612 stopped at the top side of the head tube 65. The structures of the other members of the headset 60 are similar to the corresponding members of the headset 20 of the aforesaid first embodiment. This second embodiment uses the structure of the receiving open chamber 611 of the top cup 62 to substitute for the top annular inside mounting groove 222 of the head tube 22 in the first preferred embodiment. The headset 60 further comprises a bottom cup 66 defining a receiving open chamber 661, a bottom bearing 67 mounted in the receiving open chamber 661 of the bottom cup 66, and a bottom packing member 68. The bottom cup 66 comprises an outward bottom flange 662 stopped at the bottom side of the head tube 65. The bottom bearing 67 and the bottom tightening member 68 are similar to the corresponding members of the aforesaid first embodiment of the present invention.

Figure 7:
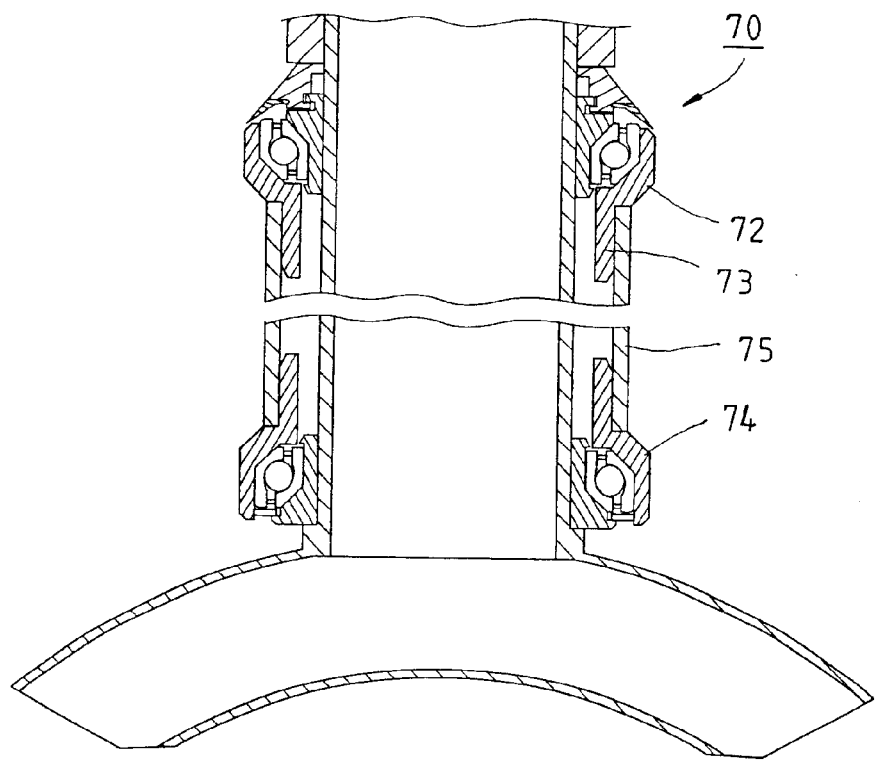
FIG. 7 is a sectional view showing a headset installed in a bicycle's head tube according to a third preferred embodiment of the present invention.

FIG. 7 shows a headset 70 according to a third preferred embodiment of the present invention. This embodiment is similar to the aforesaid second embodiment with the exception of the structure of the top cup 72 and the bottom cup 74. According to this embodiment, the top cup 72 is provided at the top side outside the head tube 75, having a downward positioning tube 73 press-fitted into the inside of the head tube 75. The structure of the bottom cup 74 is similar to the top cup 72.

Figure 8:
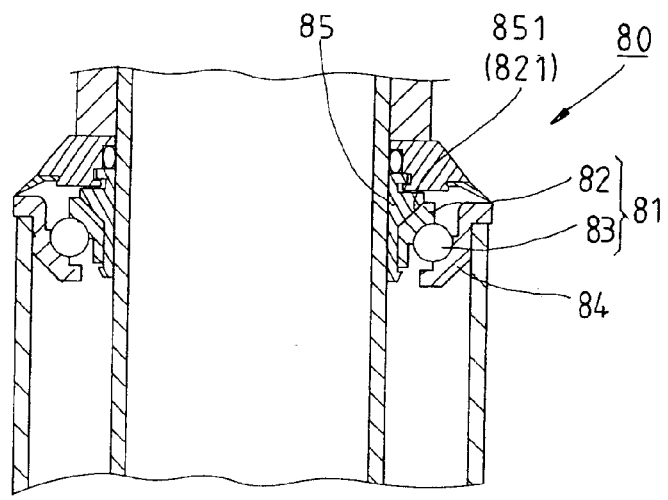
FIG. 8 is a sectional view showing a headset installed in a bicycle's head tube according to a fourth preferred embodiment of the present invention.

FIG. 8 shows a headset 80 according to a fourth preferred embodiment of the present invention. This embodiment is similar to the aforesaid second embodiment with the exception of the structure of the top bearing 81 and the bottom bearing (not shown). The top bearing 81 is comprised of an inner race 82 and a plurality of rolling balls 83 mounted in between the inner race 82 and the top cup 84 for enabling the inner race 82 to be freely rotated relative to the top cup 84. The inner race 82 has a tapered face 821 disposed at the top and fitting over the tapered face 851 of the top packing member, referenced by 85.

Figure 9:
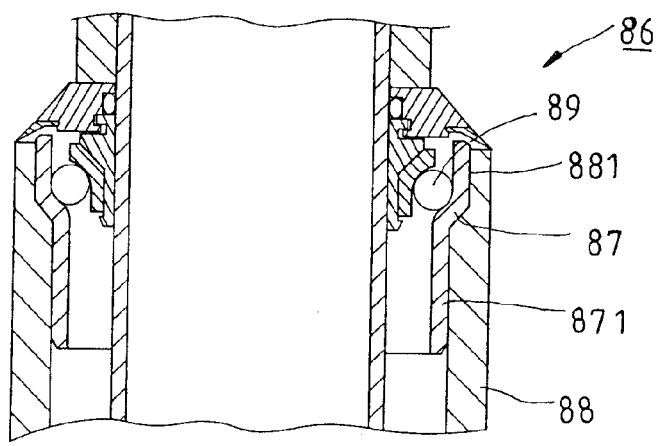
FIG. 9 is a sectional view showing a headset installed in a bicycle's head tube according to a fifth preferred embodiment of the present invention.

FIG. 9 shows a headset 86 according to a fifth preferred embodiment of the present invention. This embodiment is similar to the aforesaid third embodiment. However, the top cup 87 is not exposed to the outside of the head tube 88 but positioned in a top inside annular groove 881 in the head tube 88. Further, the top cup 87 has a downward positioning tube 871 press-fitted into the inside of the head tube 88. The structure of the top bearing 89 of the fifth embodiment is similar to the top bearing 81 of the fourth embodiment.

Figure 10:
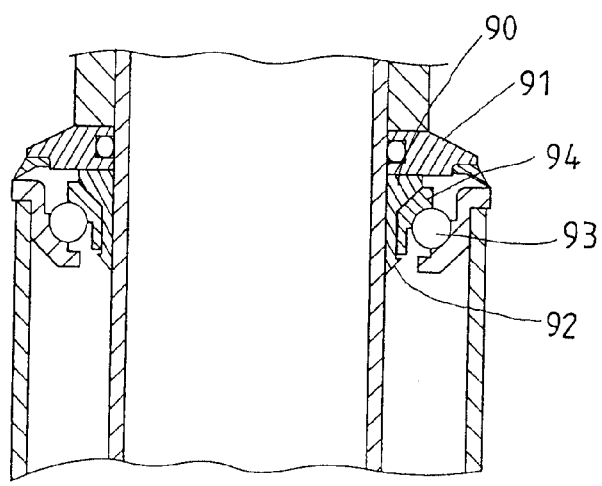
FIG. 10 is a sectional view showing a headset installed in a bicycle's head tube according to a sixth preferred embodiment of the present invention.

FIG. 10 shows still another alternate form of the present invention. According to this alternate form, the top tightening member 90 has a hooked retaining portion 92 extended from the bottom side thereof and hooked on the bottom edge of the inner race 94 of the top bearing 93. The top cap 91 is directly covered on the top tightening member 90 but not coupled to the top tightening member 90.

A prototype of headset for bicycle/tricycle has been constructed with the features of the annexed drawings of FIGS. 2–10. The headset for bicycle/tricycle functions smoothly to provide all of the features discussed earlier.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A headset installed in a frame structure of a vehicle, said frame structure comprising a head tube, a front fork having a top tube inserted through said head tube, and a handlebar stem fastened to a top end of said top tube of said front fork, said head tube having a top annular inside mounting groove in a top end thereof, the headset comprising:

an annular top bearing mounted in the top annular inside mounting groove of said head tube and peripherally disposed in contact with an inside wall of said head tube, said top bearing having a tapered face disposed on the inside at a top side thereof;

an annular top tightening member sleeved onto said top tube of said front fork and having a split, a vertical wall portion disposed in contact with the periphery of the top tube of said front fork, a top coupling flange upwardly extended from a top side of said vertical wall portion, a horizontal stop flange extended around a middle part of the periphery of said vertical wall portion, and a hooked retaining portion protruded from a bottom side of said vertical wall portion and hooked on a bottom edge of said top bearing, said horizontal stop flange having a tapered face fitting over the tapered face of said top bearing; and an annular top cap sleeved onto said top tube of said front fork and covered on said top bearing and said top tightening member at a top side and stopped at a bottom side of said handlebar stem, said top cap having an inside annular mounting groove forced into engagement with the top coupling flange of said top tightening member.

2. The headset as claimed in claim 1, wherein said top bearing comprises an outer race disposed in contact with the inside wall of said head tube, an inner race coupled to said outer race, and a plurality of rolling balls mounted in between said outer race and said inner race for enabling said outer race and said inner race to be rotated relative to each other, the tapered face of said top bearing being disposed in a top side of said inner race.

3. The headset as claimed in claim 1, wherein said head tube has a bottom annular inside mounting groove in a bottom end thereof, and the headset further comprises a bottom bearing mounted in the bottom annular inside mounting groove of said head tube, and a bottom tightening member supported on said front fork between said top tube of said front fork and said bottom bearing, said bottom bearing comprising a tapered face on the inside in a bottom side thereof, said bottom tightening member comprising a vertical wall portion, a horizontal stop flange extended around the periphery of the vertical wall portion of said bottom tightening member at a bottom side, and a hooked retaining portion protruded from a top side of the vertical wall portion of said bottom packing member and hooked on the topmost edge of said bottom bearing, the horizontal stop flange of said bottom tightening member having a tapered face fitting over the tapered face of said bottom bearing.

4. The headset as claimed in claim 3, wherein said bottom bearing comprises an outer race disposed in contact with the periphery of the bottom annular inside mounting groove of said head tube, an inner race coupled to the outer race of said bottom bearing, and a plurality of rolling balls mounted in between the outer race and inner race of said bottom bearing for enabling the outer race and inner race of said bottom bearing to be rotated relative to each other, the tapered face of said bottom bearing being provided in a bottom side of the inner race of said bottom bearing.

5. A headset installed in a frame structure of a vehicle, said frame structure comprising a head tube, a front fork having a top tube inserted through said head tube, and a handlebar stem fastened to a top end of said top tube of said front fork, the headset comprising:

an annular top cup having a receiving open chamber;

an annular top bearing mounted in the receiving open chamber of said top cup and peripherally disposed in contact with an inside wall of said top cup, said top bearing having a tapered face disposed on the inside at a top side thereof;

an annular top tightening member sleeved onto said top tube of said front fork, said top tightening member comprising a split, a vertical wall portion disposed in contact with the periphery of the top tube of said front fork, a top coupling flange upwardly extended from a top side of said vertical wall portion, a horizontal stop flange extended around a middle part of the periphery of said vertical wall portion, and a hooked retaining portion protruded from a bottom side of said vertical wall portion and hooked on a bottom edge of said top bearing, said horizontal stop flange having a tapered face fitting over the tapered face of said top bearing; and an annular top cap sleeved onto said top tube of said front fork and covered on said top bearing and said top tightening member at a top side and stopped at a bottom side of said handlebar stem, said top cap having an inside annular mounting groove forced into engagement with the top coupling flange of said top tightening member.

6. The headset as claimed in claim 5, wherein said top cup has an outward top flange stopped at the topmost edge of said head tube.

7. The headset as claimed in claim 5, wherein said top cup comprises downward positioning tube press-fitted into said head tube.

8. The headset as claimed in claim 5, wherein said top bearing comprises an outer race disposed in contact with the inside wall of said top cup, an inner race coupled to said outer race, and a plurality of rolling balls mounted in between said outer race and said inner race for enabling said outer race and said inner race to be rotated relative to each other, the tapered face of said top bearing being disposed in a top side of said inner race.

9. The headset as claimed in claim 5, wherein said top bearing comprises an inner race, and a plurality of rolling balls mounted in between said inner race and said top cup for enabling the inner race of said top bearing to be rotated relative to said top cup, the tapered face of said top bearing being disposed in a top side of the inner race of said top bearing.

10. The headset as claimed in claim 5 further comprising a bottom cup having a receiving open chamber, a bottom bearing mounted in the receiving open chamber of said bottom cup, and a bottom tightening member shaped like a split ring and supported on said front fork between said top tube of said front fork and said bottom bearing, said bottom bearing comprising a tapered face on the inside in a bottom side thereof, said bottom tightening member comprising a vertical wall portion, a horizontal stop flange extended around the periphery of the vertical wall portion of said bottom tightening member at a bottom side, and a hooked retaining portion protruded from a top side of the vertical wall portion of said bottom tightening member and hooked on the topmost edge of said bottom bearing, the horizontal stop flange of said bottom tightening member having a tapered face fitting over the tapered face of said bottom bearing.

11. The headset as claimed in claim 10, wherein said bottom cup comprises an outward flange stopped at a bottom end of said head tube.

12. The headset as claimed in claim 10, wherein said bottom cup comprises an upward positioning tube press-fitted into said head tube.

13. The headset as claimed in claim 10, wherein said bottom bearing comprises an outer race disposed in contact with the periphery of the receiving open chamber of said bottom cup, an inner race coupled to the outer race of said bottom bearing, and a plurality of rolling balls mounted in between the outer race and inner race of said bottom bearing for enabling the outer race and inner race of said bottom bearing to be rotated relative to each other, the tapered face of said bottom bearing being provided in a bottom side of the inner race of said bottom bearing.

14. The headset as claimed in claim 10, wherein said bottom bearing comprises an inner race, and a plurality of rolling balls mounted in between said inner race and said bottom cup for enabling said inner race to be rotated relative to said bottom cup, the tapered face of said bottom bearing being disposed in a bottom side of the inner race of said bottom bearing.

15. A headset comprising:
an annular top bearing having a tapered face disposed in a top side thereof on the inside;
an annular top tightening member having a split, a vertical wall portion, a top coupling flange upwardly extended from a top side of said vertical wall portion, a horizontal stop flange extended around a middle part of the periphery of said vertical wall portion, and a hooked retaining portion protruded from a bottom side of said vertical wall portion and hooked on a bottom edge of said top bearing, said horizontal stop flange having a tapered face fitting over the tapered face of said top bearing; and
an annular top cap covered on said top tightening member and said top bearing at a top side, said top cap having an inside annular mounting groove forced into engagement with the top coupling flange of said top tightening member.

16. The headset as claimed in claim 15, wherein said top bearing comprises an outer race, an inner race coupled to said outer race, and a plurality of rolling balls mounted in between said outer race and said inner race for enabling said outer race and said inner race to be rotated relative to each other, the tapered face of said top bearing being disposed in a top side of said inner race.

17. The headset as claimed in claim 15 further comprising an annular top cup, said annular top cup having a receiving open chamber adapted for receiving said top bearing.

18. The headset as claimed in claim 17, wherein said top bearing comprises an inner race, and a plurality of rolling balls mounted in between said inner race and said top cup for enabling said inner race to be rotated relative to said top cup, the tapered face of said top bearing being disposed in a top side of said inner race.

19. A headset comprising:
an annular bottom bearing having a tapered face disposed in a bottom side thereof on the inside; and
a bottom tightening member shaped like a split ring, said bottom tightening member having a split, a vertical wall portion, a horizontal stop flange extended around the periphery of the vertical wall portion of said bottom tightening member at a bottom side, and a hooked retaining portion protruded from a top side of the vertical wall portion of said bottom tightening member and hooked on the topmost edge of said bottom bearing, the horizontal stop flange of said bottom tightening member having a tapered face fitting over the tapered face of said bottom bearing.

20. The headset as claimed in claim 19, wherein said bottom bearing comprises an outer race, an inner race coupled to said outer race, and a plurality of rolling balls mounted in between said outer race and said inner race for enabling said outer race and said inner race to be rotated relative to each other, the tapered face of said bottom bearing being disposed in a bottom side of said inner race.

21. The headset as claimed in claim 19 further comprising an annular bottom cup having a receiving open chamber adapted for receiving said bottom bearing.

22. The headset as claimed in claim 21, wherein said bottom bearing comprises an inner race and a plurality of rolling balls mounted in between said inner race and said bottom cup for enabling said inner race to be rotated relative to said bottom cup, the tapered face of said bottom bearing being disposed in a bottom side of said inner race.

23. A headset comprising:

an annular top cup having a receiving open chamber;

a top bearing having an inner race, and a plurality of rolling balls mounted in between said inner race and said top cup for enabling said inner race to be rotated relative to said top cup, said inner race having a tapered face in a top side thereof on the inside;

an annular top tightening member shaped like a split ring, said top tightening member having a split, a vertical wall portion, a stop flange outwardly extended around a top side of the periphery of said vertical wall portion, and a hooked retaining portion protruded from a bottom side of said vertical wall portion and hooked on a bottom edge of said inner race, said stop flange having a tapered face fitting over the tapered face of said top bearing; and an annular top cap covered on said top bearing and said top tightening member at a top side and disposed in contact with a top side of said top tightening member.

* * * * *